Patented Sept. 18, 1928.

1,684,426

UNITED STATES PATENT OFFICE.

EVERETT RAYMOND WILES, OF BARNSDALL, OKLAHOMA.

METHOD OF TREATING PETROLEUM PRODUCTS.

No Drawing.   Application filed April 24, 1923.   Serial No. 634,367.

This invention relates to the recovery of amorphous paraffine of high melting point from petrolatum.

In the refining of petroleum containing paraffine by distillation various fractions are obtained, the lighter fractions being substantially free from paraffine, which remains in the heavier distillates and residues. This paraffine as it exists in the crude petroleum is practically all in the amorphous state as distinguished from the crystalline state, and during the process of distillation under certain conditions the amorphous paraffine is converted by vaporization largely into the crystalline state and this may be separated in the ordinary way by chilling the distillate and filter pressing. In the heavier distillates much of this paraffine after it has been vaporized is still in the amorphous state, and this prevents commercial separation by means of filter pressing. Also the paraffine remaining in the residuum is practically all in the amorphous state and cannot be separated by ordinary filter press methods.

Petrolatum is produced as a by-product from these residuums when removing it from the residuum in order that the residuum may have a sufficiently low cold test to answer for general lubricating purposes. It has been discovered that this petrolatum as produced commercially contains a large percentage of lubricating oil, and heretofore no efficient commercial means has been found to separate same, and this process not only recovers the lubricating oil, but produces an amorphous paraffine of much increased value, having a higher melting point, and possessing many of the characteristics of bees-wax.

While the invention primarily relates to the separation of oil from petrolatum and the recovery of paraffine, it is also applicable to the treatment of other petroleum fractions and products containing paraffine, and by the application of the invention it becomes possible to recover and utilize valuable materials which have been isolated heretofore only by the application of complicated and expensive processes.

In carrying out the invention the material to be treated, petrolatum for example, is subjected to the action of a solvent which dissolves all of the material with the exception of the paraffine. Various solvents may be used but a solvent consisting of a mixture of acetone and benzol is preferred. Suitable proportions are thirty-five per cent of acetone and sixty-five per cent of benzol. It is essential that the solvent or combination of solvents used exhibit a high solvent power on the oil at all temperatures and a very sharply descending solubility curve on the paraffine when concentration is plotted against temperature. This permits substantially complete separation of the paraffine by cooling the solution when the solvent action has been completed. The solvent described has the properties mentioned. As a substitute for benzol, naphtha or other petroleum fractions, carbon-tetrachloride or chloroform or other solvents exhibiting high solvent action at all temperatures on the oil might be employed, and as a substitute for acetone, ethyl alcohol (absolute) could be used, or other solvents exhibiting a very sharply descending solubility curve on the paraffine when concentration is plotted against temperature.

In carrying out the invention for the treatment of petrolatum the admixture of solvent and petrolatum should be in such proportions that the oil remaining in solution after the removal of the paraffine will be not more than approximately twenty per cent. The mixture is heated preferably to approximately 100° F. Heating is not essential but facilitates solution. The mixture is then chilled and the paraffine separated by filter pressing, settling, or other suitable means. With pressure or vacuum filters, the process is more rapid and pressure is preferred because of the avoidance of evaporation losses. After filtration the solvent is recovered from the separated paraffine and from the solution by evaporation. This evaporation must be carefully conducted to avoid losses of the relatively expensive solvent. The solvent is returned for reuse in the treatment of further quantities of petrolatum. To insure the original concentration of the solvent, it may be desirable to add acetone or benzol thereto. The proper concentration is obtained by means of the refractive index. That of benzol is $N_d = 1.5030$ and that of acetone is $N_d = 1.3652$. The refractive index of the mixed solvent is $N_d = 1.4558$, the readings being made at 15.55° C. or 60° F. The indices mentioned are for chemically pure materials and will vary somewhat if commercial materials are used.

As an example of the application of the invention, about 227 grams of petrolatum was mixed with 1000 cc. of the mixed solvent described and chilled to 30° F. The wax was separated by filtration and the solvent was recovered by evaporation. The result of this test was:

|  | Per cent. |
|---|---|
| Amount of oil recovered | 51.9 |
| Amount of wax recovered | 46.1 |
| Amount of solvent recovered | 97.3 |

It thus appears that approximately half of the petrolatum which is a waste product of the refinery for which no adequate outlet is available is oil which can be recovered and utilized as a lubricating material. Moreover, the wax obtained is a valuable product which is used for many purposes.

The foregoing illustration applies particularly to the treatment of petrolatum. As has been noted, however, the process may be applied to various other refinery products including distillates and residues in which paraffine is present. In practicing the invention for the treatment of such distillates and residues, the proportions of solvent and of the ingredients thereof will vary, depending upon the special conditions affecting the treatment. Other solvents than those specified which have the necessary characteristics may be used, and the details of temperature to which the mixture is heated and cooled to effect solution and separation of the wax will be determined readily by preliminary tests which must be conducted in each case to insure efficient treatment of the material.

The changes and variations suggested may be made without departing from the invention or sacrificing the advantages thereof.

I claim:—

The method of recovering amorphous paraffin of high melting point from petrolatum, which comprises treating the petrolatum with a mixed solvent consisting of approximately 35% of acetone and 65% of benzol, cooling the solution and separating the paraffin therefrom.

In testimony whereof I affix my signature.

EVERETT RAYMOND WILES.